UNITED STATES PATENT OFFICE.

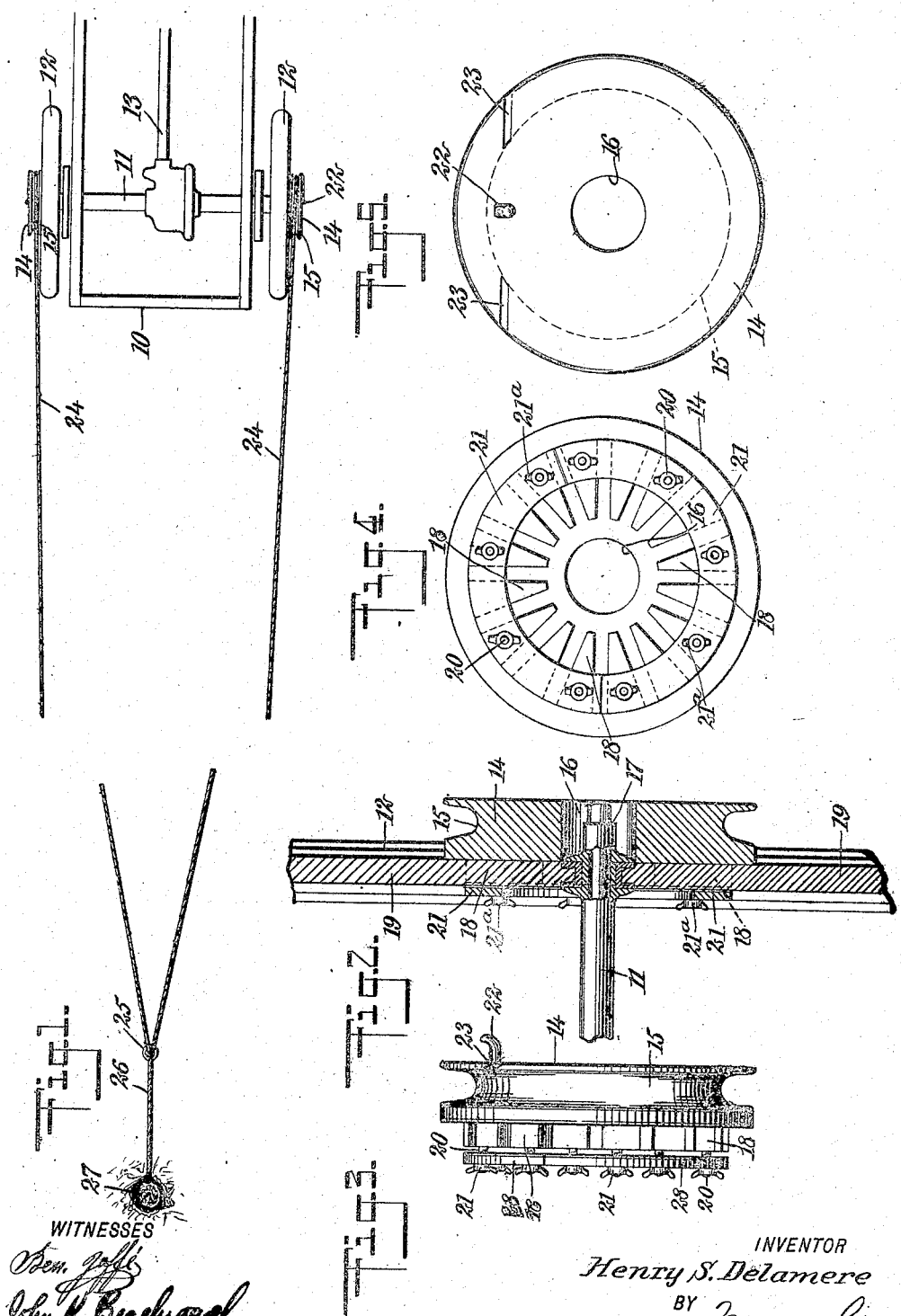

HENRY S. DELAMERE, OF FERNDALE, CALIFORNIA.

ATTACHMENT FOR AUTOMOBILES.

936,866.

Specification of Letters Patent.

Patented Oct. 12, 1909.

Application filed August 21, 1908. Serial No. 449,587.

*To all whom it may concern:*

Be it known that I, HENRY S. DELAMERE, a citizen of the United States, and a resident of Ferndale, in the county of Humboldt and State of California, have invented a new and Improved Attachment for Automobiles, of which the following is a full, clear, and exact description.

This invention relates to attachments for automobiles, by means of which the vehicles can be drawn out of mud holes, sand pits and the like, by their own power, and relates more particularly to an attachment consisting of a drum adapted to be removably secured to a driving wheel of an automobile, a line adapted to be wound upon the drum when the driving wheel is actuated by the motor of the vehicle, and means for attaching the line to a fixed support, such as a tree or post, or a stake driven into the ground.

An object of the invention is to provide a simple, inexpensive and efficient attachment for automobiles by means of which one or both of the driving wheels of an automobile will actuate a removable drum upon which a line can be wound up, to draw the automobile out of a mud hole or sand pit, and up steep grades or hills.

A further object of the invention is to provide a device of the class described, by means of which the power of the automobile can be used to draw the vehicle out of a mud hole or a sand pit, or up a steep hill, without the necessity of utilizing draft animals or the like.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a plan view showing the rear of an automobile chassis, with my invention applied to the driving wheel thereof, and showing a line secured to a stake driven into the ground; Fig. 2 is an enlarged transverse section showing a portion of a driving wheel having my invention applied thereto; Fig. 3 is an end elevation, the device being removed; Fig. 4 is a side elevation of the drum showing the inner side or face of the same; and Fig. 5 is a similar view showing the opposite face.

Before proceeding to a more detailed explanation of my invention, it should be clearly understood that it can be advantageously applied to all types of automobiles or motor vehicles having driving wheels.

The device can be fashioned from any suitable material, preferably from cast metal or the like, and includes a drum having means for removably attaching it to a driving wheel, to convert the driving wheel itself into a drum upon which a line can be wound up when the driving wheel is actuated, to drag the vehicle from one point to another. I prefer to employ two of these drums, one for each of the driving wheels, together with a line having two runs each adapted to be wound upon one of the drums. The drums can be reversed, so that each can be used on the other of the driving wheels.

Referring more particularly to the drawings, 10 represents the chassis of an automobile, having a rear or driving axle 11 and driving wheels 12, the axle being connected by suitable mechanism 13 with the motor. I provide a drum or disk 14 having a peripheral groove 15 upon which the line can be wound. Substantially at the center, the drum has an opening 16 formed to receive the hub 17 of a driving wheel 12. At the inner face of the drum are rigid blocks 18, preferably integral with the drum and having radial spaces therebetween formed to receive the spokes 19 of the wheel. It will be understood that any desired number of blocks 18 can be provided; if found necessary, one may be provided for the space between each two spokes or if the vehicle is of a lighter construction, a lesser number of blocks can be employed. Certain of the blocks have outwardly extending screw stems 20 upon which are movably mounted curved ring sections 21 which, together constitute an annular member, substantially concentric with the opening 16. Thumb nuts 21ª are removably mounted upon the stems 20 and serve to secure the ring sections in place.

A stud 22 is mounted upon the outer face of the drum, preferably intermediate two slots 23 through the outer rim of the peripheral groove of the drum. A line 24, which may be of any suitable form, consisting for example, of a light rope, has one end fastened to the stud 22 and is passed through one of the slots 23 into the groove 15, so that it can be wound upon the drum. If two drums are used the corresponding lines 24 have the free ends connected by means of a ring 25 which in turn is secured at an end of a further line 26. The latter can be fastened to any fixed support such as a post or a tree, or to a stake 27 adapted to be driven into the ground.

If the vehicle becomes stalled in a mud hole, a sand pit or the like from which it cannot be driven by means of the driving wheels, the drums are attached to the driving wheels by placing them at the outside of the wheels, with the hubs inserted in the openings 16, the ring sections having been first removed. The blocks 18 are located between adjacent spokes and the ring sections are then replaced and secured in position by means of the thumb nuts 21ª. The line 26 is then attached to the fixed support and the motor driven to wind the lines 24 upon the drums, thereby withdrawing the vehicle from the mud hole or other point of the road at which it is stalled.

The drum and the other parts of my invention can be suitably padded or upholstered so that the danger of injuring the driving wheels or marring the paint is obviated.

Having thus described my invention, I claim as new, and desire to secure by Letters Patent:

1. A device of the class described comprising a removable drum having means whereby it may be attached to a wheel of an automobile, said drum having a grooved periphery, and a hook extending from the outer face thereof, the adjacent edge of the groove being slotted on each side of the hook for the purpose set forth.

2. A device of the class described comprising a removable drum having means whereby it may be attached to the wheel of an automobile, said drum having a grooved periphery and a hook extending from the outer face of the drum, the edge of the groove adjacent to the hook being slotted for the purpose set forth.

In testimony whereof I have signed my name to this specification in the presence of two subscribing witnesses.

HENRY S. DELAMERE.

Witnesses:
G. S. DELAMERE,
D. H. SAWATH.